United States Patent
Bausch et al.

[11] Patent Number: 6,161,366
[45] Date of Patent: Dec. 19, 2000

[54] METHOD AND APPARATUS FOR TRANSVERSELY WELDING AND SEVERING A THERMOPLASTIC WRAPPER SLEEVE

[75] Inventors: Günther Bausch, Immendingen, Germany; Thomas Strasser, Benken, Switzerland

[73] Assignee: SIG Pack Systems AG, Beringen, Switzerland

[21] Appl. No.: 09/276,911

[22] Filed: Mar. 26, 1999

[30] Foreign Application Priority Data

Mar. 27, 1998 [CH] Switzerland ............ 0737/98

[51] Int. Cl.[7] .................................................. B65B 51/10
[52] U.S. Cl. ........................... 53/477; 53/373.7; 53/375.9
[58] Field of Search ................... 53/477, 374.6, 53/374.5, 375.3, 373.7, 375.9

[56] References Cited

U.S. PATENT DOCUMENTS

| | | |
|---|---|---|
| 3,692,613 | 9/1972 | Pederson . |
| 5,001,891 | 3/1991 | Abate ................................. 53/373.7 |
| 5,056,295 | 10/1991 | Williams ............................. 53/373.7 |
| 5,131,213 | 7/1992 | Shanklin et al. ....................... 53/477 |
| 5,463,851 | 11/1995 | Nagai ................................. 53/375.3 |
| 5,673,534 | 10/1997 | Fowler ................................ 53/375.3 |
| 5,755,076 | 5/1998 | Otsuka ............................... 53/373.7 |
| 5,771,660 | 6/1998 | Loewenthal .......................... 53/374.6 |

FOREIGN PATENT DOCUMENTS

| | | |
|---|---|---|
| 2 230 484 | 12/1974 | France . |
| 2 345 347 | 10/1977 | France . |
| 96/17720 | 6/1996 | WIPO . |

*Primary Examiner*—Eugene Kim
*Attorney, Agent, or Firm*—Venable; Gabor J. Kelemen

[57] ABSTRACT

An apparatus for transversely sealing and severing a thermoplastic wrapper sleeve to obtain individual packages, includes a first welding and severing unit movable back and forth in a first direction and having a first holder; a heated rail and a first clamping mechanism, both supported by the first holder. The first clamping mechanism has first and second clamping components movable toward and away from one another in a second direction oriented transversely to the first direction. A second welding and severing unit is movable back and forth in the first direction and having a second holder; a spring-loaded counter holder mounted on the second holder for cooperating with the rail; and a second clamping mechanism supported by the second holder and having third and fourth clamping components movable toward and away from one another in the second direction. A drive mechanism moves the first and second welding and severing units simultaneously toward one another to clamp the wrapper sleeve therebetween by the first and second clamping mechanisms and to engage the wrapper sleeve by the rail and the counter holder, and for simultaneously moving the first and second clamping components as well as the third and fourth clamping components toward and away from one another.

12 Claims, 9 Drawing Sheets

METHOD AND APPARATUS FOR TRANSVERSELY WELDING AND SEVERING A THERMOPLASTIC WRAPPER SLEEVE

CROSS REFERENCE TO RELATED APPLICATION

This application claims the priority of Swiss Application No. 737/98 filed Mar. 27, 1998, which is incorporated herein by reference.

BACKGROUND OF THE INVENTION

In packing machines which make packages having a wrapper sleeve envelope, the sheet from which the wrapper sleeve is made has, as a rule, at least two layers. In the finished package, the outer layer has a higher melting point than the inner layer to provide for an easy transverse sealing and severance of the packages. The temperature of the sealing shoes is maintained at a temperature which is below the melting temperature of the outermost layer, but above the melting temperature of the innermost layer. The individual, interconnected package sleeves may be severed by a knife integrated into one of the sealing shoes.

A sealing and severing apparatus of the above-outlined type is described, for example, in published International Application WO 96/17720. Such apparatuses, however, are less adapted for packages which have wrapper sleeves consisting of a single material (monofilms), for example, of low-pressure polyethylene, because such films tend to stick to the sealing (welding) shoes.

SUMMARY OF THE INVENTION

It is an object of the invention to provide an improved method and apparatus of the above-outlined type which are particularly adapted for welding a transverse seam on the wrapper sleeve and severing the wrapper sleeve into individual packages.

This object and others to become apparent as the specification progresses, are accomplished by the invention, according to which, briefly stated, the apparatus for transversely sealing and severing a thermoplastic wrapper sleeve to obtain individual packages, includes a first welding and severing unit movable back and forth in a first direction and having a first holder; a heated rail and a first clamping mechanism, both supported by the first holder. The first clamping mechanism has first and second clamping components movable toward and away from one another in a second direction oriented transversely to the first direction. A second welding and severing unit is movable back and forth in the first direction and having a second holder; a spring-loaded counter holder mounted on the second holder for cooperating with the rail; and a second clamping mechanism supported by the second holder and having third and fourth clamping components movable toward and away from one another in the second direction. A drive mechanism moves the first and second welding and severing units simultaneously toward one another to clamp the wrapper sleeve therebetween by the first and second clamping mechanisms and to engage the wrapper sleeve by the rail and the counter holder, and for simultaneously moving the first and second clamping components as well as the third and fourth clamping components toward and away from one another.

DESCRIPTION OF THE PREFERRED EMBODIMENT

Figure 1:
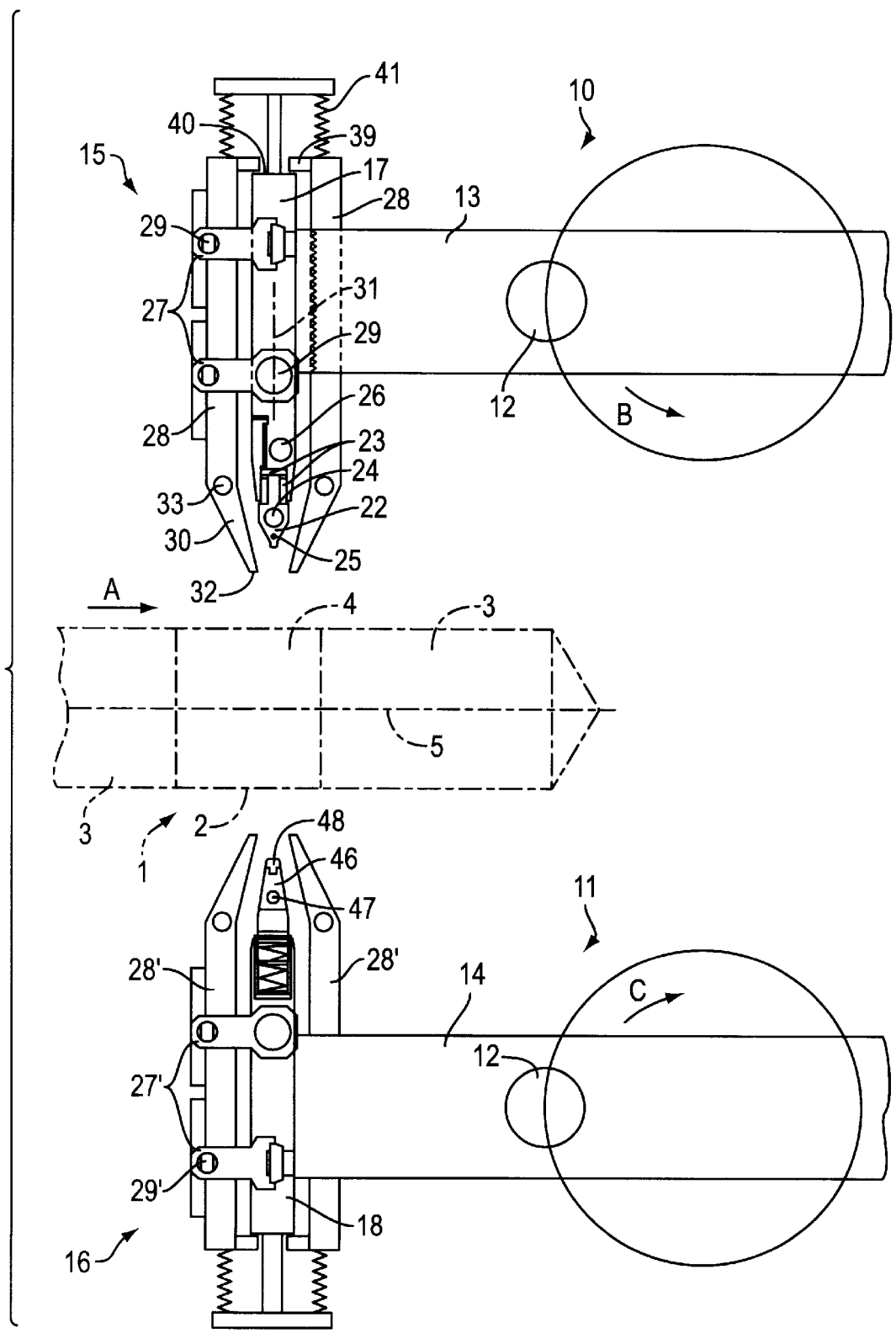
FIG. 1 is a side elevational view of a preferred embodiment of the invention.

Turning to FIG. 1, the apparatus shown therein is installed as part of a horizontal wrapper sleeve packing machine. A sleeve (hose) 1 which has been previously provided with a longitudinal seam and which is made of a thermoplastic material such as low-pressure polyethylene is advanced in the conveying direction A. Products 3 to be wrapped are deposited on the sleeve 1 in uniform distances. The transverse weld (separating seam) is formed in the intermediate space 4 between two adjoining products 3.

The apparatus has upper and lower drive units 10 and 11 which may be of a structure as disclosed in the earlier-noted Published International Application WO96/17720. By means of respective pairs of cranks 12 (only one shown in each instance) the units 10 and 11 drive two respective horizontal carriers 13 and 14 parallel to themselves along a circular path in synchronism with and in opposite directions to one another. One of the four cranks 12 is driven by a non-illustrated motor, while the remaining three cranks 12 are coupled by a transmission gearing to the driven crank 12. The rpm of the motor is controlled such that the horizontal component of the circumferential velocity of the cranks 12 is, during the welding and severing step, approximately identical to the conveying speed of the wrapper sleeve 1 as it travels in the direction A.

To each carrier 13, 14 respective welding and severing units 15 and 16 are secured which include a respective holder 17 and 18 attached to the respective carrier 13 and 14. A wedge-shaped heating rail 22 is secured to the bottom of the holder 17 with the interposition of insulating plates 23 made, for example, of $ZrO_2$. At the bottom, the rail 22 has a semicircular cross section and is heated by a heating bar 24 passing through the rail 22. The rail temperature is detected by a sensor 25, and the heat output of the heating bar 24 is regulated such that a set temperature is maintained. Above the insulating plates 23 the holder 17 has at least one through bore 26 for the passage of cooling water.

To each side of the holder 17 parallel, essentially horizontally extending pivot arms 27 of a holding mechanism or holding plate 28 are secured which operate as parallelogram linkages. The pivot arms 27 and the respective articulations 29 are drawn only for the left-hand plate 28; the right-hand plate 28 is mounted in the same manner on the holder 17 but is axially offset. The lower portion 30 of the plates 28 is tapering in a wedge-shaped manner and is inclined toward the central plane 31 of the holder 17 and has a planar horizontal end face 32. The lower portion 30 is further provided with a cooling channel 33 for the passage of cooling water. In the position illustrated in FIG. 1, the stops 39 of the plate 28 lie against the respective abutment faces 40 of the holder 17. The plates 28 are biased by springs 41 towards the central plane 5 of the wrapper sleeve 1, and the end faces 32 of the plates 28 are situated underneath the underside of the rail 22.

The unit 16 is substantially a mirror image of the unit 15 as related to the central plane 5 of the wrapper sleeve 1. Accordingly, parts of the unit 16 which are similar to those of the unit 15 are provided with the same, but primed, reference numerals. The unit 16 differs essentially from the unit 15 in that instead of rail 22 and plates 23 it has a counter holder 46 which has a coolant bore 47 and which tapers in a wedge-shaped manner and has on the top a PTFE insert 48 with fiberglass or carbon inlays. The counter holder 46 is guided in the holder 18 for vertical displacements and is biased by a spring 49 towards the central plane 5.

Figure 2:
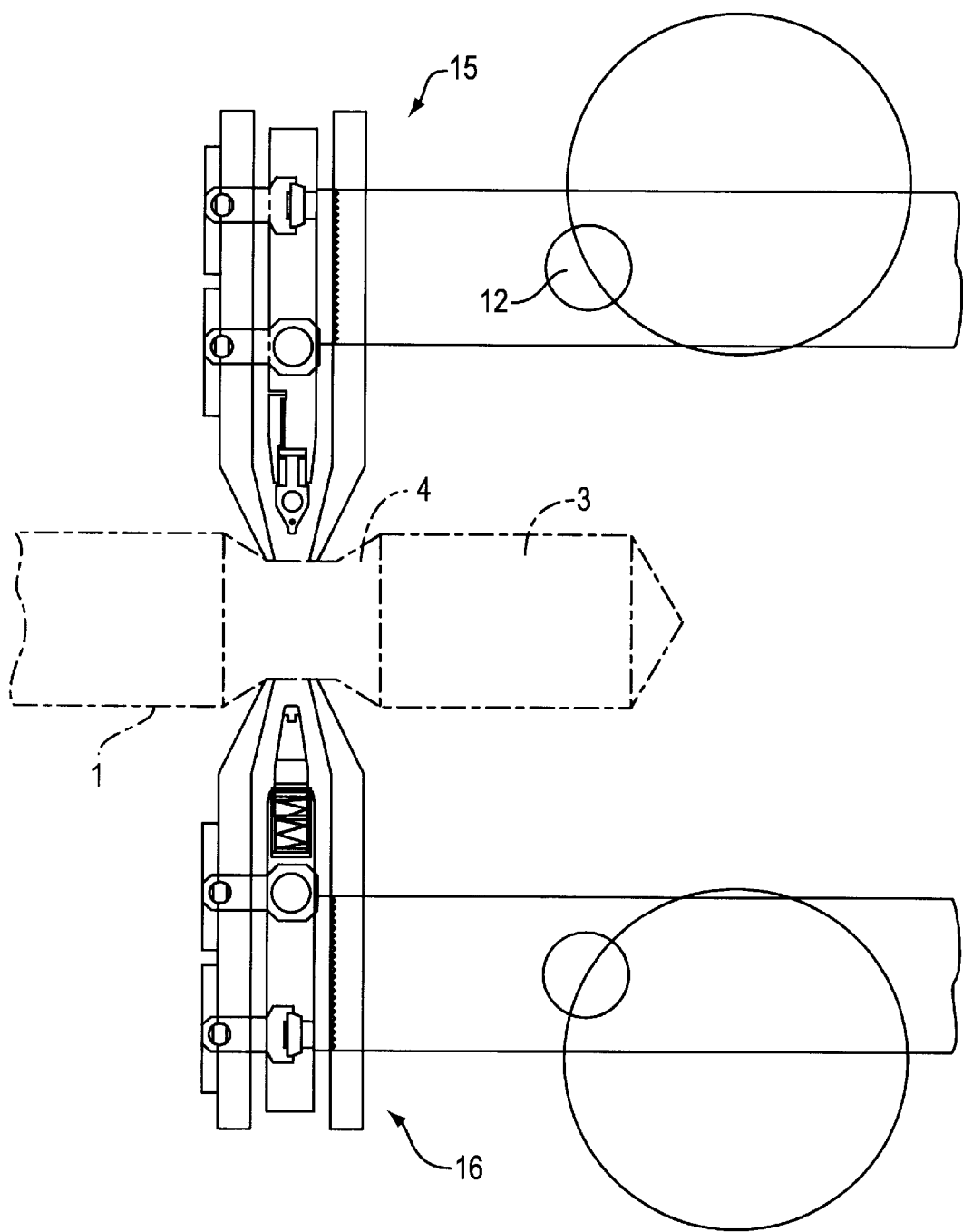
FIGS. 2–9 are side elevational views of the preferred embodiment showing eight consecutive phases of the seam welding and severing procedure.
Figure 3:
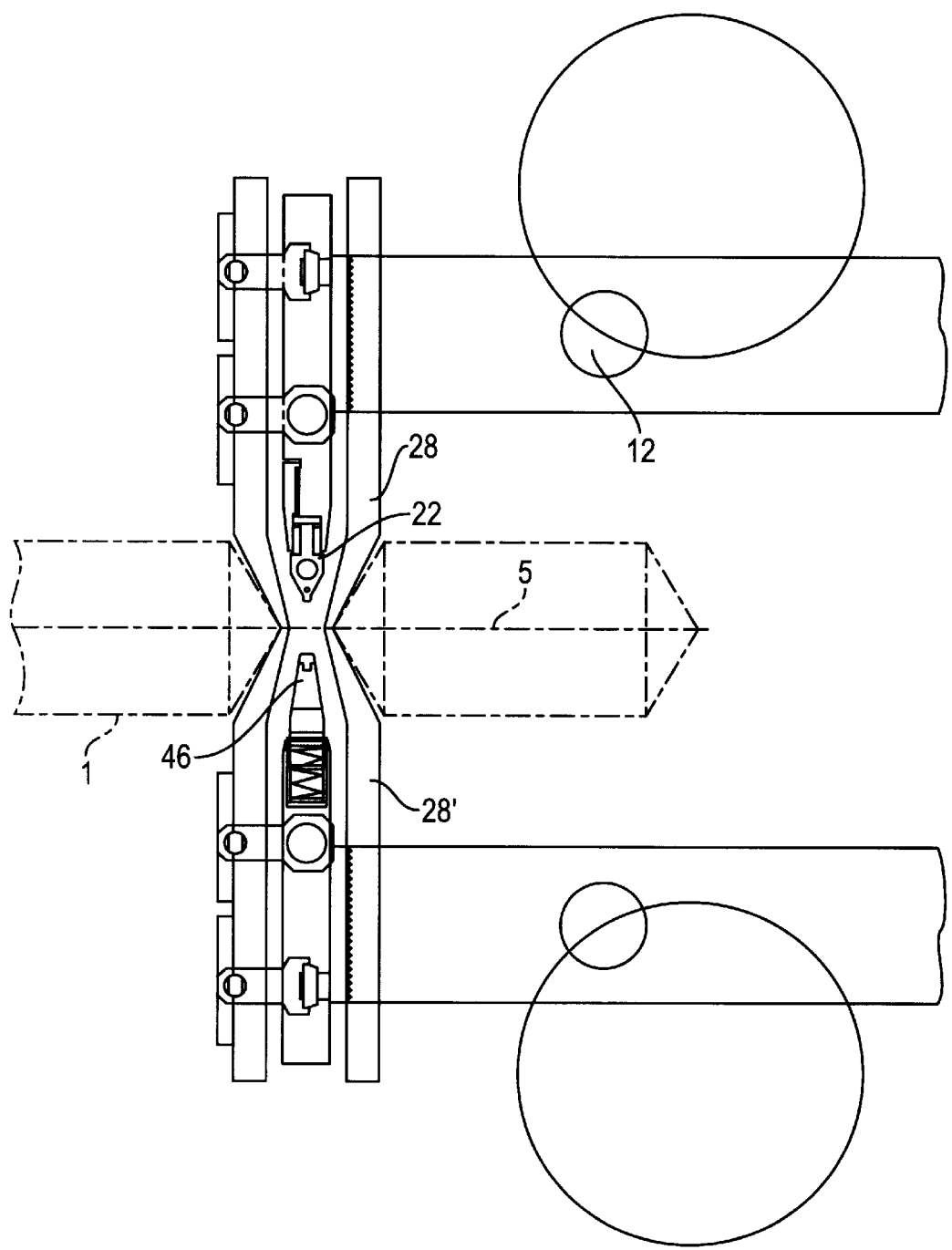
Figure 4:
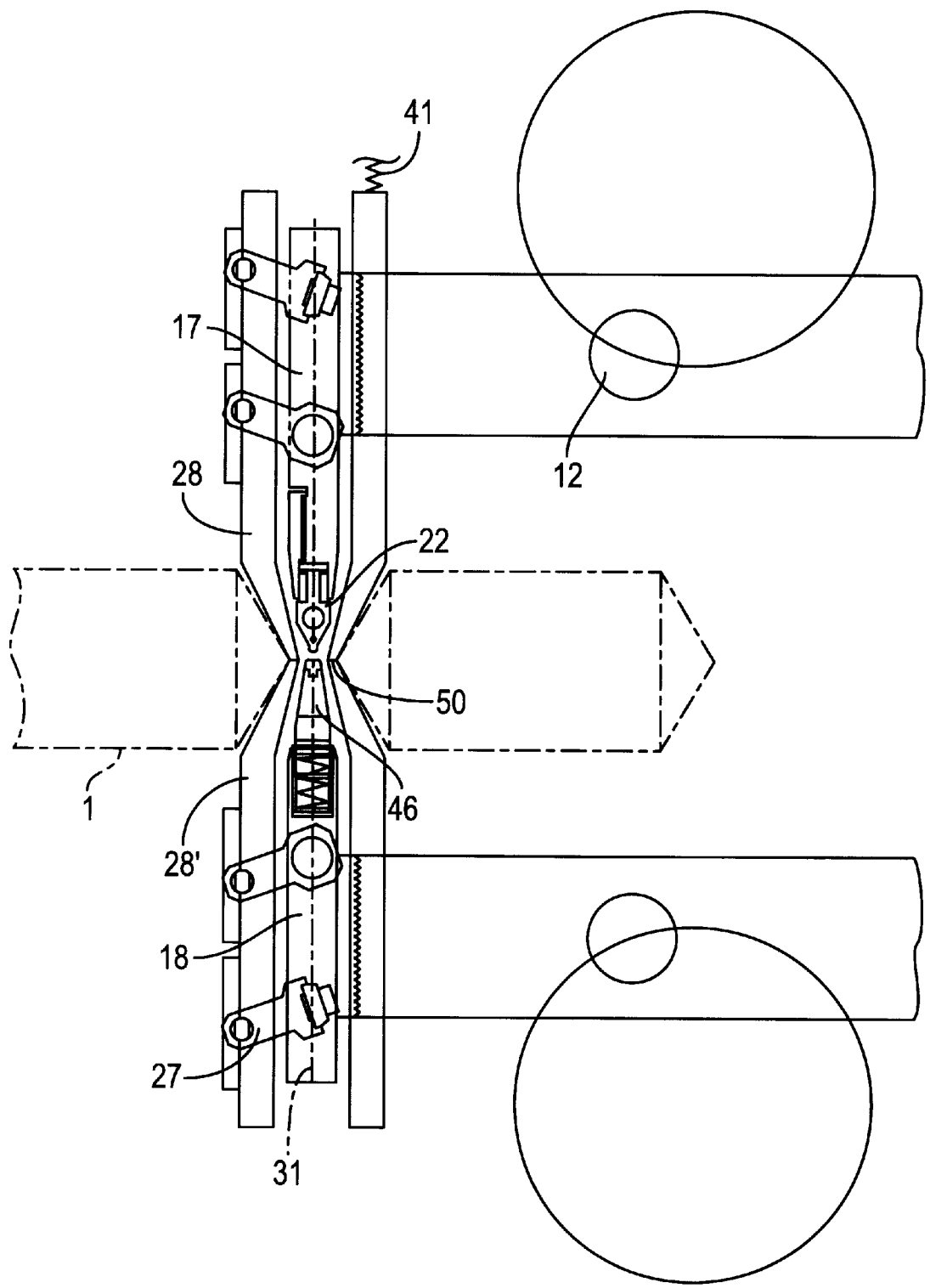
Figure 5:
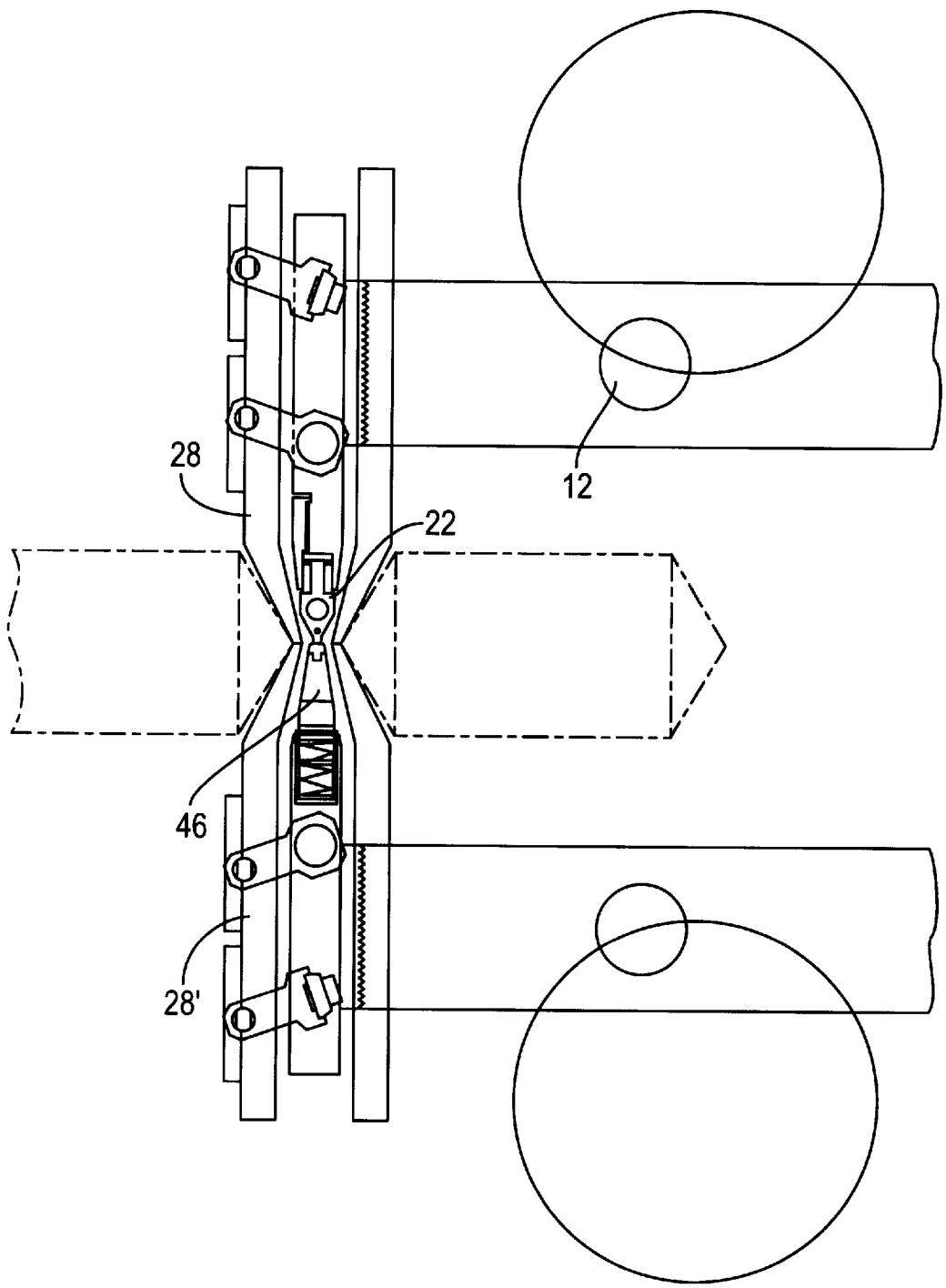
Figure 6:
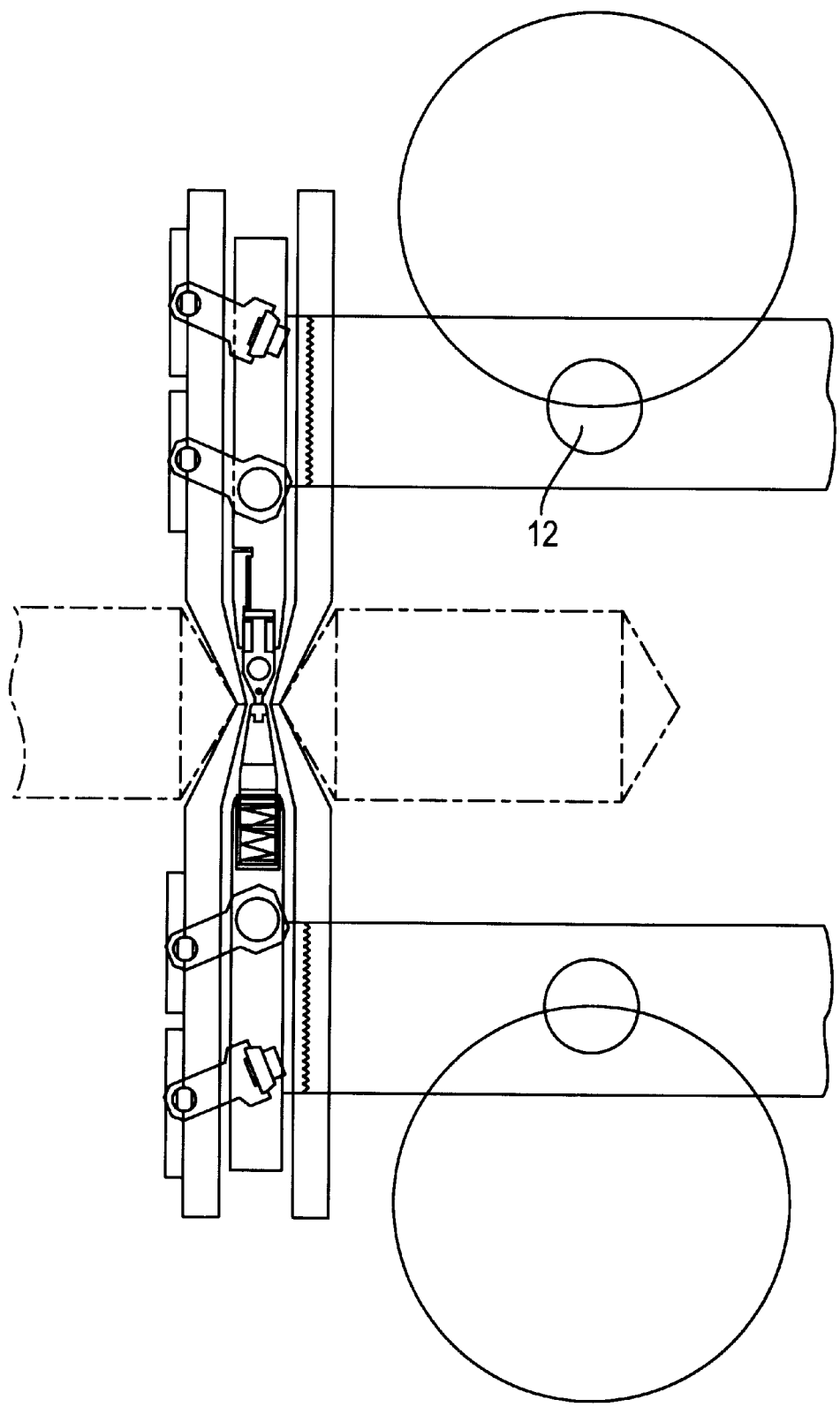
Figure 7:
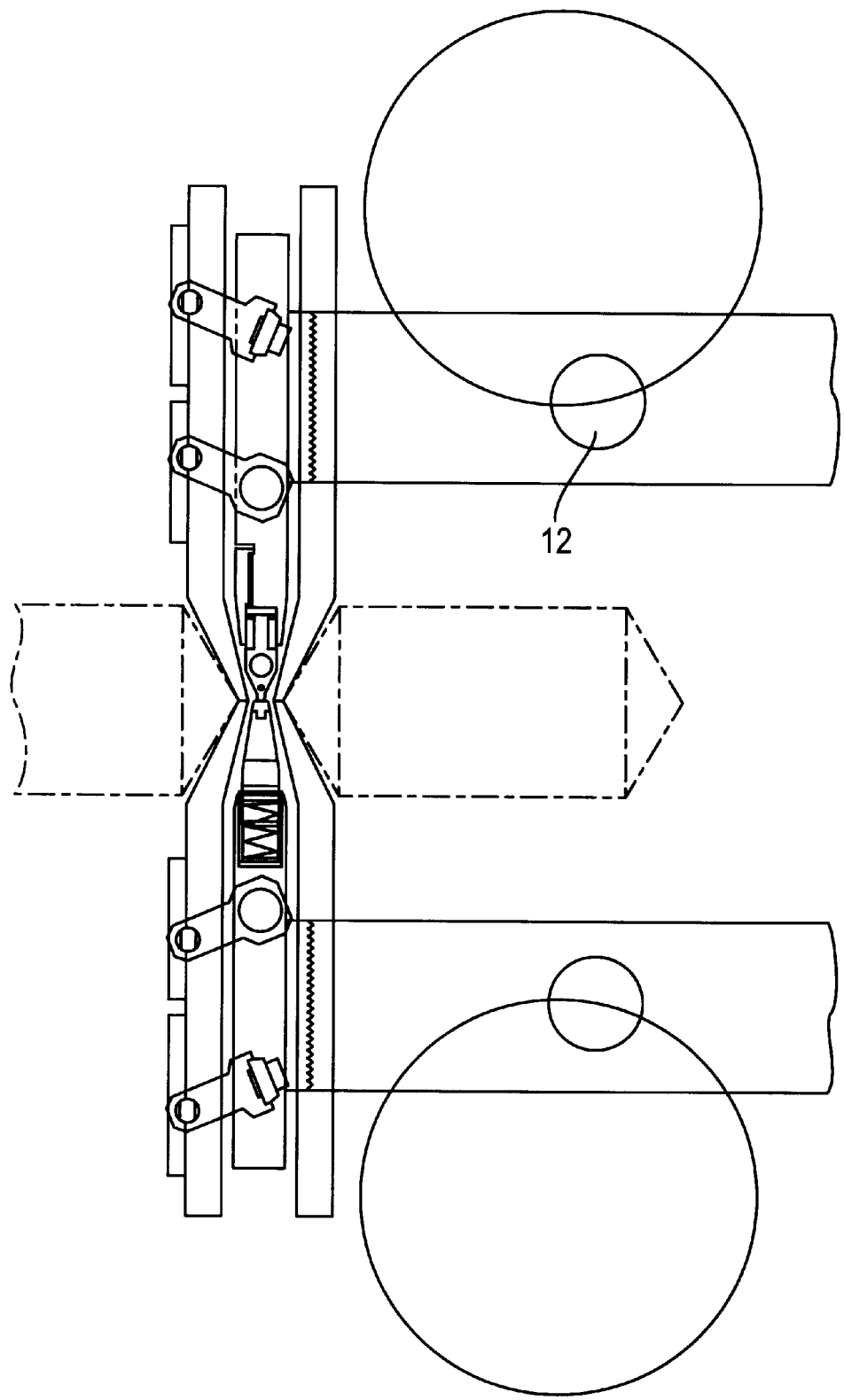
Figure 8:
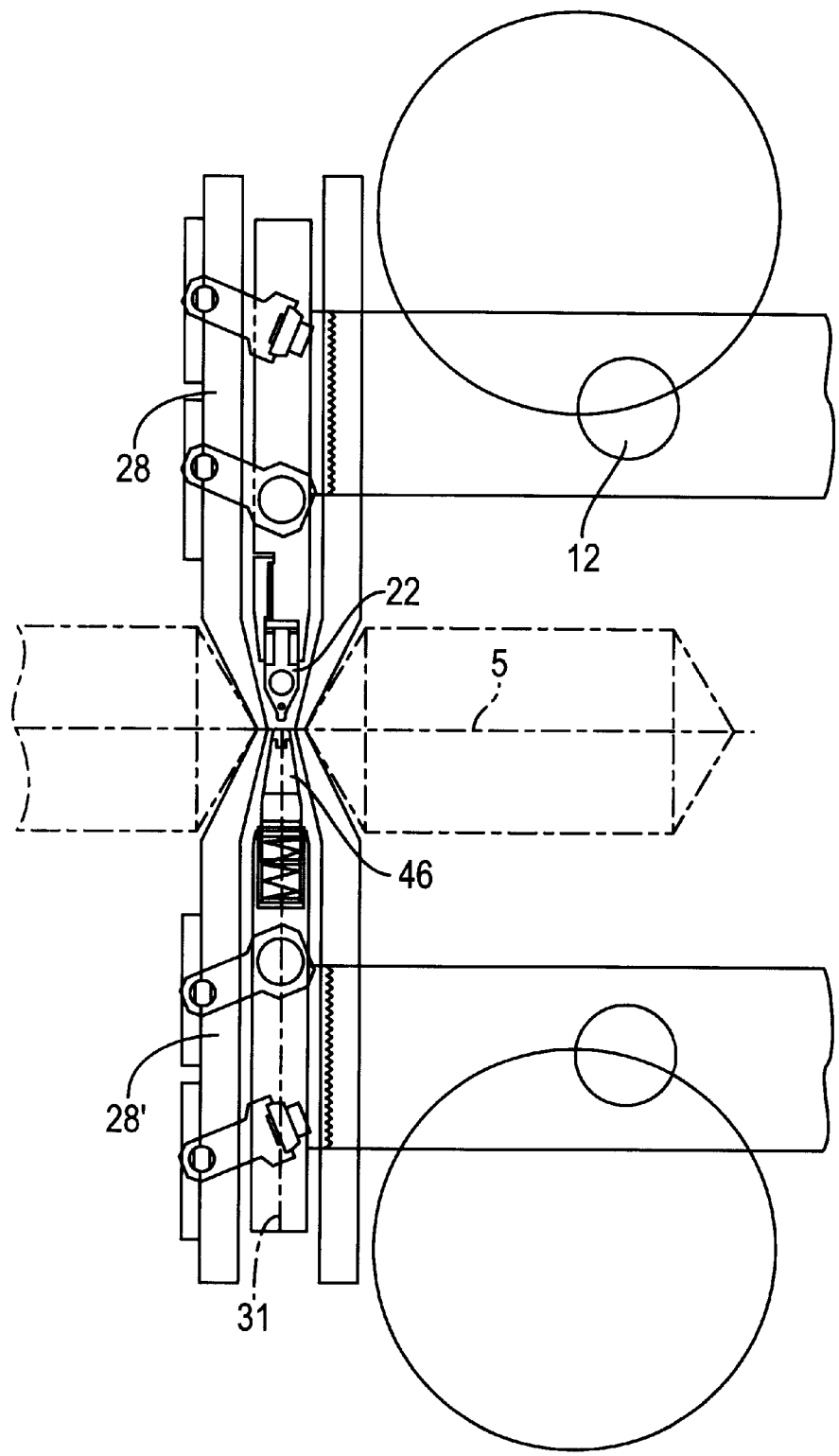
Figure 9:
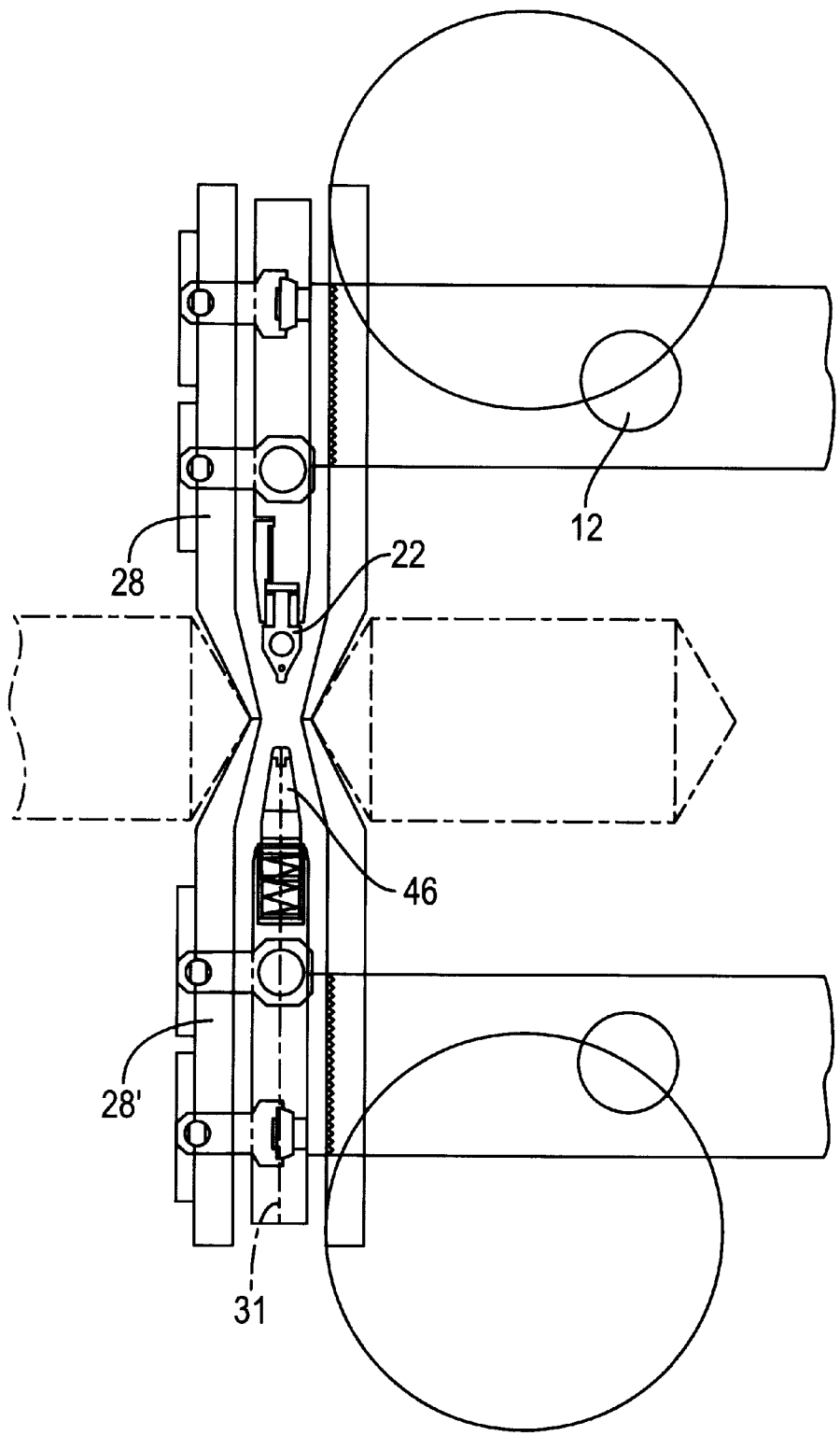

In operation, the cranks 12 rotate in the direction of the arrows B and C and the units 15 and 16 execute a circular motion parallel to themselves. As the units 15, 16 approach the wrapper sleeve 1, they press the latter in the region of the intermediate space 4 between the products 3 from both sides, as shown in FIG. 2. FIG. 3 illustrates the position in which the wrapper sleeve 1 has just been clamped between the end faces 32 of the facing plates 28, 28'. The rail 22 and the counter holder 46 are still spaced from the central plane 5. Because of the wedge-shaped taper and the inclination of the plates 28, 28', the intermediate space 4 need not be wide, whereby packing material is saved. As the cranks 12 continue to rotate (FIG. 4), the plates 28, 28' shift relative to the holders 17, 18 against the force of the springs 41 so that the sleeve 1 is clamped between the facing plates 28, 28' and the pivot arms 27 are pivoted so that the plates 28, 28' are shifted towards the central plane 31. As a result, the region 50 of the sleeve 1 is slightly upset (bunched) between the plates 28, 28'. The counter holder 46 reaches the sleeve region 50 before the rail 22 does, so that, as shown in FIG. 5, the region 50 is slightly lifted until the rail 22 arrives into contact therewith. As a result, the sleeve region 50 is tensioned. The counter holder 46 is pressed from such a position inwardly against the force of the spring 49, whereupon transverse welding and severance of the wrapper sleeve 1 is effected. FIG. 6 shows the position in the dead center of the cranks 12. Upon further rotation of the cranks 12, as shown in FIGS. 7, 8 and 9, first the rail 22 and the counter holder 46 separate from one another and the plates 28, 28' are moved away from the central plane 31.

By means of the described apparatus, a transverse welding of the sleeve 1 of superior quality may be obtained since the sleeve 1 is pressed flat before the heating rail 22 and the counter holder 48 arrive in engagement therewith. Further, an excellent severance between the packages may be ensured, because the sleeve portions are pulled apart after welding. The apparatus is well adapted for the welding of single-layer films made, for example, of polyethylene, and a good seam quality may be achieved. An additional cutting is not required. The vigorous cooling of the plates 28, 28' prevents a soiling by weld residuals.

As a departure from the described embodiment, the motion of the plates 28, 28' perpendicularly to the central plane 31 may also be effected by control means other than the illustrated parallelogram linkage 27, such as cylinders which are cycled in synchronism with the angle of rotation of the cranks 12. In such a case the motion of the plates 28, 28' perpendicularly to the plane 31 during the holding step may occur either only before or only after the passage of the dead center of the cranks 12. This may have advantages for certain materials of the sleeve 1.

It will be understood that the above description of the present invention is susceptible to various modifications, changes and adaptations, and the same are intended to be comprehended within the meaning and range of equivalents of the appended claims.

What is claimed is:

1. An apparatus for providing a transverse seam on a thermoplastic wrapper sleeve of indefinite length between goods contained therein and for severing the wrapper sleeve at the transverse seam to obtain individual packages; said apparatus comprising (a) a first welding and severing unit movable back and forth in a first direction and having (1) a first holder;
   (2) a rail supported by said first holder;
   (3) means for heating said rail; and
   (4) a first clamping mechanism supported by said first holder and having first and second clamping components on either side of said first holder; said first and second clamping components being movable toward and away from one another in a second direction oriented transversely to said first direction;

(b) a second welding and severing unit movable back and forth in said first direction and having (1) a second holder;
   (2) a spring-loaded counter holder mounted on said second holder for cooperating with said rail; and
   (3) a second clamping mechanism supported by said second holder and having third and fourth clamping components on either side of said second holder; said third and fourth clamping components being movable toward and away from one another in said second direction; and (c) drive means for moving said first and second welding and severing units simultaneously toward one another to clamp the wrapper sleeve therebetween by said first and second clamping mechanism and to engage the wrapper sleeve by said rail and said counter holder, and for simultaneously moving said first and second clamping components toward and away from one another and said third and fourth clamping components toward and away from one another.

2. The apparatus as defined in claim 1, wherein said rail and said counter holder taper toward one another.

3. The apparatus as defined in claim 1, further comprising a heat insulation separating said rail from said first holder, and further wherein said first holder has a coolant-carrying bore.

4. The apparatus as defined in claim 1, wherein said counter holder has a coolant-carrying bore.

5. The apparatus as defined in claim 1, wherein said rail has a working zone at which it contacts the wrapper sleeve; said working zone having an at least approximately semi-circular contour.

6. The apparatus as defined in claim 1, wherein said first and second clamping components have a free terminal length portion inclined toward said rail and oriented at an acute angle toward one another; and further wherein said third and fourth clamping components have a free terminal length portion inclined toward said counter holder and oriented at an acute angle toward one another.

7. The apparatus as defined in claim 1, wherein said first, second, third and fourth clamping components have coolant-carrying bores.

8. The apparatus as defined in claim 1, wherein said drive means includes means for moving in synchronism said first and second clamping components toward and away from one another and said third and fourth clamping components toward and away from one another.

9. The apparatus as defined in claim 8, wherein said means for moving in synchronism includes first parallelogram linkages mounting said first and second clamping components to said first holder and second parallelogram linkages mounting said third and fourth clamping components to said second holder.

10. A method of providing a transverse seam on a thermoplastic wrapper sleeve of indefinite length between goods contained therein and severing the wrapper sleeve at the transverse seam to obtain individual packages with an apparatus as defined in claim 1, comprising the following steps:

(a) moving said first holder and said second holder toward one another in said first direction in a first phase to cause the wrapper sleeve to be clamped by said first and second clamping mechanisms in cooperation with one another;

(b) moving said first holder and said second holder toward one another in said first direction in a subsequent, second phase to cause the wrapper sleeve to be clamped by said rail and said counter holder in cooperation with one another to effect sealing and severance of the wrapper sleeve;

(c) moving said first and said second holder away from one another in said first direction; and (d) while performing step (c), moving said first and second clamping components away from one another in said second direction, parallel to a central plane of the wrapper sleeve and moving said third and fourth clamping components away from one another in said second direction, parallel to the central plane of the wrapper sleeve.

11. The method as defined in claim 10, further comprising the step of moving, while performing step (b), said first and second clamping components toward one another in said second direction, parallel to the central plane of the wrapper sleeve and moving said third and fourth clamping components toward one another in said second direction, parallel to the central plane of the wrapper sleeve.

12. The method as defined in claim 10, further comprising the step of severing the wrapper sleeve externally of the central plane of the wrapper sleeve.

* * * * *